United States Patent
Yan et al.

(10) Patent No.: US 12,192,911 B2
(45) Date of Patent: Jan. 7, 2025

(54) METHOD AND APPARATUS FOR POWER CONTROL

(71) Applicant: Lenovo (Beijing) Limited, Beijing (CN)

(72) Inventors: Zhi Yan, Xicheng District (CN); Haipeng Lei, Haidian District (CN); Jie Shi, Haidian District (CN); Lianhai Wu, Chaoyang (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 357 days.

(21) Appl. No.: 17/640,116

(22) PCT Filed: Sep. 29, 2019

(86) PCT No.: PCT/CN2019/109209
§ 371 (c)(1),
(2) Date: Mar. 3, 2022

(87) PCT Pub. No.: WO2021/056569
PCT Pub. Date: Apr. 1, 2021

(65) Prior Publication Data
US 2023/0156609 A1    May 18, 2023

(51) Int. Cl.
*H04W 52/14* (2009.01)
*H04W 52/08* (2009.01)
*H04W 52/10* (2009.01)

(52) U.S. Cl.
CPC .......... *H04W 52/146* (2013.01); *H04W 52/08* (2013.01); *H04W 52/10* (2013.01)

(58) Field of Classification Search
CPC ..... H04W 52/04; H04W 52/06; H04W 52/08; H04W 52/10; H04W 52/14;
(Continued)

(56) References Cited

U.S. PATENT DOCUMENTS 8,983,524 B2 *   3/2015   Dick .................. H04W 52/241
                                                          455/522
9,974,027 B2 *   5/2018   Nama ................ H04W 52/241
(Continued)

FOREIGN PATENT DOCUMENTS

CA     3067267 A1 *  12/2018   .......... H04W 52/146
CN     1512802 A       7/2004
(Continued)

OTHER PUBLICATIONS

"International Preliminary Report on Patentability", PCT Application No. PCT/CN2019/109209, Apr. 7, 2022, 5 pages.
(Continued)

*Primary Examiner* — Quochien B Vuong
(74) *Attorney, Agent, or Firm* — FIG. 1 Patents

(57) ABSTRACT

Embodiments of the present application are directed to a method and apparatus for power control. In an embodiment of the present application, the method includes transmitting an uplink signal, wherein a transmission power of the uplink signal is determined according to a power control scheme, and the power control scheme is selected from at least one of an open loop power control scheme, a first closed loop power control scheme, a second closed loop power scheme with power ramping step selection, a third closed loop power scheme with scaling factor to power adjustment indicator, a fourth closed loop power scheme with later uplink signal corresponding power adjustment indicator adoption.

20 Claims, 7 Drawing Sheets

(58) Field of Classification Search
CPC ... H04W 52/146; H04W 52/18; H04W 52/24; H04W 52/241; H04W 52/245; H04W 52/26; H04W 52/30; H04W 52/36; H04W 52/362; H04W 52/38; H04W 52/44; H04W 52/48

See application file for complete search history.

(56) References Cited

U.S. PATENT DOCUMENTS

| | | | |
|---|---|---|---|
| 10,104,624 B2 * | 10/2018 | Sundararajan | H04W 52/50 |
| 2018/0332541 A1 * | 11/2018 | Liu | H04W 52/242 |

FOREIGN PATENT DOCUMENTS

| | | |
|---|---|---|
| CN | 102150460 A | 8/2011 |
| CN | 102577530 A | 7/2012 |
| CN | 105052052 A | 11/2015 |
| WO | 2018210241 A1 | 11/2018 |

OTHER PUBLICATIONS

"International Search Report and Written Opinion", PCT Application No. PCT/CN2019/109209, Jun. 29, 2020, 8 pages.

* cited by examiner

METHOD AND APPARATUS FOR POWER CONTROL

TECHNICAL FIELD

Embodiments of the present application generally relate to wireless communication technology, especially to a method and apparatus for power control in Narrow Band Internet of Things (NB-IoT).

BACKGROUND

The following abbreviations and acronyms are herewith defined, at least some of which are referred to within the following description.

Third Generation Partnership Project ("3GPP"), Cyclic redundancy check ("CRC"), Downlink Control Information ("DCI"), Downlink ("DL"), Downlink Pilot Time Slot ("DwPTS"), Evolved Node B ("eNB"), 5G Node B ("gNB"), European Telecommunications Standards Institute ("ETSI"), Frequency Division Duplex ("FDD"), Frequency-Division Multiplexing ("FDM"), Frequency Division Multiple Access ("FDMA"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Information Element ("IE"), Long Term Evolution ("LTE"), LTE Advanced ("LTE-A"), Media Access Control ("MAC"), Master Information Block ("MIB"), Machine Type Communication ("MTC"), MTC physical downlink control channel ("MPDCCH"), Narrow Band Internet of Things ("NB-IoT"), Narrow Band-Physical Uplink Control Channel ("NPDCCH"), Narrow Band-Physical Uplink Shared Channel ("NPUSCH"), New Radio ("NR"), Physical control format indicator channel ("PCFICH"), Physical Downlink Shared Channel ("PDSCH"), Physical hybrid ARQ indicator channel ("PHICH"), Physical Uplink Control Channel ("PUCCH"), Physical Uplink Shared Channel ("PUSCH"), Quadrature Phase Shift Keying ("QPSK"), Quadrature amplitude modulation ("QAM"), Radio Resource Control ("RRC"), Received Signal Strength Indicator ("RSSI"), Reference Signal Received Power ("RSRP"), Reference Signal Received Quality ("RSRQ"), Receive ("RX"), Radio Network Temporary Identifier ("RNTI"), Redundancy Version ("RV"), Single Cell Point to Multipoint System ("SC-PTM"), Information Block ("SIB"), Transport Block ("TB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UMTS"), Single-Carrier Frequency Division Multiple Access ("SC-FDMA"), Transmission Power Control ("TPC"), Resource unit ("RU"), Narrow Band Reference Signal ("NSR").

NB-IoT is a standards-based low power wide area (LPWA) technology developed to enable a wide range of new IoT devices and services. NB-IoT significantly improves the power consumption of user devices, system capacity and spectrum efficiency. More than 10 years of battery life can be supported for a wide range of use cases.

Power control includes open loop power control and closed loop power control. For LTE and NB-IoT system, uplink power control determines the average power over a SC-FDMA symbol in which the physical channel is transmitted. Closed loop power control scheme is most important power control scheme in LTE system. In Rel. 17 NB-IoT system, a feedback channel is proposed to be introduced for NB-IoT system, so the closed loop power control scheme can also be introduced to improve the UE power consumption with feedback information.

SUMMARY OF THE APPLICATION

Embodiments of the present application provide a method and apparatus for power control in NB-IoT system.

An embodiment of the present application provides a method. The method may include: transmitting an uplink signal, wherein a transmission power of the uplink signal is determined according to a power control scheme, and the power control scheme is selected from at least one of an open loop power control scheme, a first closed loop power control scheme, a second closed loop power scheme with power ramping step selection, a third closed loop power scheme with scaling factor to power adjustment indicator, a fourth closed loop power scheme with later uplink signal corresponding power adjustment indicator adoption.

In an embodiment of the present application, the power control scheme is selected based on at least one of subcarrier spacing of the uplink signal, scheduling delay, resource unit (RU) size of the uplink signal, repetition number of the uplink signal, transmission gap, radio resource control (RRC) signaling, and a threshold.

In an embodiment of the present application, the first closed loop power control scheme is a power control scheme that the transmission power of the uplink signal is determined by a power adjustment indicator indicated by a control signal.

In an embodiment of the present application, the second closed loop power control scheme is a power control scheme that the transmission power of the uplink signal is determined by a power adjustment indicator indicated by a control signal, the power adjustment indicator is determined based on at least one of scheduling delay, RU size of the uplink signal, repetition number of the uplink signal, transmission gap, RRC signaling, and a threshold.

In an embodiment of the present application, the third closed loop power scheme with scaling factor to power adjustment indicator is a power control scheme that the transmission power of the uplink signal is determined by a power adjustment indicator indicated by a control signal and by a scaling factor. The scaling factor is configured by higher layer, and the scaling factor is determined based on at least one of scheduling delay, RU size of the uplink signal, repetition number of the uplink signal, transmission gap, RRC signaling, and a threshold. The threshold is configured by the RRC signaling or fixed.

In an embodiment of the present application, the fourth closed loop power scheme with later uplink signal corresponding power adjustment indicator adoption is a power control scheme that the transmission power of the uplink signal is determined by a first number of power adjustment indicators indicated by control signals corresponding to the uplink signal and later uplink signals later than the uplink signal. The first number is determined by a maximal hybrid automatic repeat request (HARQ) process number. The control signals are between a second number of time units before a previous one uplink signal of the uplink signal and a third number of time units before the uplink signal, and wherein the second number and the third number are a fixed number or a minimum scheduling delay or configured by RRC signaling.

Another embodiment of the present application provides an apparatus. The apparatus may include at least one non-transitory computer-readable medium having computer executable instructions stored therein: at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can select flexible power control scheme according to parameters, for example, scheduling delay, RU size of the uplink signal, repetition number of the uplink signal, transmission gap, or the like. In addition, more precise and later uplink grant power adjustment indication may be adopted for uplink transmission power control.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
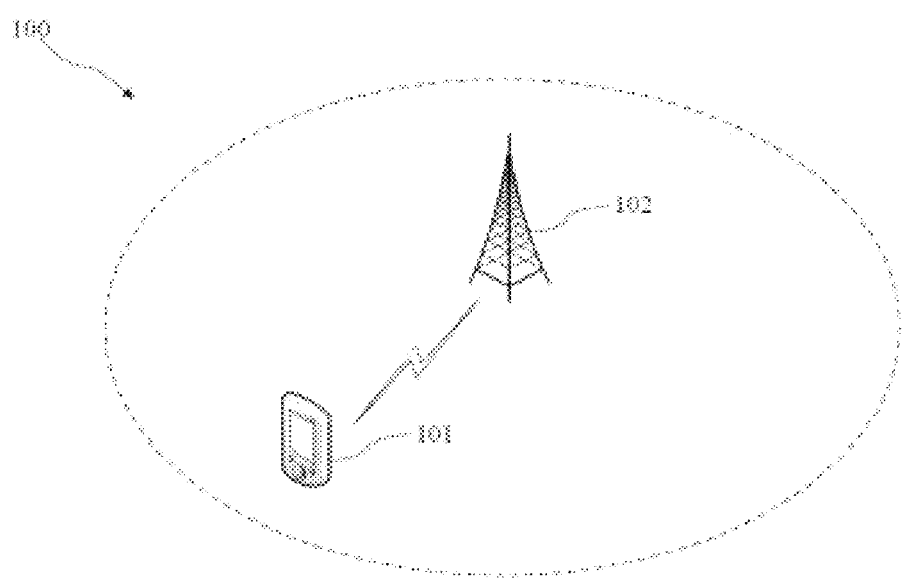
FIG. 1 illustrates a wireless communication system according to some embodiments of the present application.

FIG. 1 illustrates a wireless communication system according to some embodiments of the present application.

Referring to FIG. 1, a wireless communication system 100 may include a user equipment (UE) 101 and a base station (BS) 102. Although a specific number of UE 101 and BS 102 are depicted in FIG. 1, it is contemplated that any number of UEs 101 and BSs 102 may be included in the wireless communication system 100.

In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s) 102.

A UE 101 may directly communicate with the BS 102 via uplink communication signals. The UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In some embodiments of the present application, a UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, a UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In addition, in some embodiments of the present application, a UE 101 may include, for example, but is not limited to, wearable devices, such as smart watches, fitness bands, optical head-mounted displays, or the like.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and UE 101 transmit data on the UL using a SC-FDMA or OFDM scheme. More generally, however, the wireless communication system 100 may implement some other open or proprietary communication protocols, for example, WiMAX, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. The present application is not intended to be limited to the implementation of any particular wireless communication system architecture or protocol. In yet some embodiments of present application, the BS 102 may communicate with UE 101 using the 3GPP 5G protocols.

For NB-IoT system, cross subframe scheduling is supported for both uplink and downlink transmission, and uplink transmission may be several subframes later than corresponding uplink grant.

Figure 2:
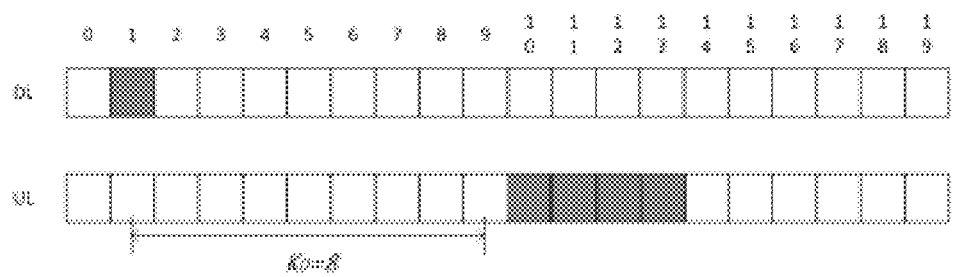
FIG. 2 is a schematic view of NPDCCH schedule NPUSCH format 1 according to some embodiments of the present application.

FIG. 2 is a schematic view of NPDCCH schedule NPUSCH format 1. NPDCCH carries downlink control information (DCI) which includes resource allocation and other control information, for example, the number of transmission and scheduling delay time r to its scheduled NPDSCH or NPUSCH. The UE needs to demodulate the DCI in the NPDCCH first, and then can demodulate NPDSCH (including broadcast messages, paging, UE data, etc.) belonging to the UE itself at the corresponding resource location. The NPDCCH (for example, DCI format N0 in LTE system) includes an uplink grant to indicate resources used by the UE for uplink data transmission. For NPUSCH, two formats, that is, NPUSCH format 1 and NPUSCH format 2 are defined. NPUSCH format 1 is designed for uplink data on UL-SCH, and NPUSCH format 2 is used for transmitting uplink control information (UCI).

In FIG. 2, downlink transmission is represented by "DL", uplink transmission is represented by "UL". As shown in FIG. 2, NPDCCH transmits uplink grant in DL subframe 1, and the uplink grant indicates resources and scheduling delay used by the UE for uplink data transmission. For example the scheduling delay is indicated as $K_0=8$ as DCI format N0 for FDD in Table 1, so the uplink grant in DL subframe 1 schedules the uplink signal transmission transmitted in UL subframe 10.

TABLE 1

| $k_0$ for DCI format N0 for FDD | |
|---|---|
| $ID_{elay}$ | $k_0$ |
| 0 | 8 |
| 1 | 16 |
| 2 | 32 |
| 3 | 64 |

As shown in Table 1, DCI format N0 includes scheduling delay field ($I_{Delay}$) and the corresponding scheduling delay field ($k_0$), and the scheduling delay is $k_0=\{8, 16, 32, 64\}$. That is, FIG. 2 shows a case where $I_{Delay}=0$, the corresponding scheduling delay $k_0=8$.

According to Table 1, in some cases, for example, when $I_{Delay}=3$, the scheduling delay may be up to 64 ms. Thus a power adjustment indicator indicated by an uplink grant in DCI may be not valid for the large scheduling delay. The power adjustment indicator can be used to calculate the UE's transmission power.

NPUSCH Structure

For NB-IoT uplink structure, RUs are used to describe the mapping of the NPUSCH to resource elements. A RU is defined as $N_{symb}^{UL} N_{slots}^{UL}$ SC-FDMA symbols in the time domain and $N_{sc}^{RU}$ consecutive subcarriers in the frequency domain, where $N_{sc}^{RU}$ and $N_{symb}^{UL}$ are given by Table 2 for frame structure type 1. In Table 2, Δf represents subcarrier spacing of uplink signal, which has two values, 3.75 kHz and 15 KHz.

TABLE 2

| Supported combinations of $N_{sc}^{RU}$, $N_{slots}^{UL}$, $N_{symb}^{UL}$ for frame structure type | | | | |
|---|---|---|---|---|
| NPUSCH format | Δf | $N_{sc}^{RU}$ | $N_{slots}^{UL}$ | $N_{symb}^{UL}$ |
| 1 | 3.75 kHz | 1 | 16 = 32 ms | 7 |
|   | 15 kHz | 1 | 16 = 8 ms | |
|   |   | 3 | 8 = 4 ms | |
|   |   | 6 | 4 = 2 ms | |
|   |   | 12 | 2 = 1 ms | |
| 2 | 3.75 kHz | 1 | 4 = 8 ms | |
|   | 15 kHz | 1 | 4 = 2 ms | |

From Table 2, one RU duration (or referred to be as RU size) for NPUSCH format 1 and 2 is determined by the subcarrier offset, range from 1 ms to 32 ms. In particular, for NPUSCH format 1:

when the subcarrier space is 3.75 kHz, only single frequency transmission is supported, one RU includes one subcarrier in the frequency domain and 16 time slots in the time domain. Therefore, the RU size (that is, the length of one RU) is 32 ms;

when the subcarrier space is 15 kHz, single frequency transmission and multi-frequency transmission are supported, and one RU includes 1 subcarrier and 16 time slots, and the RU size is 8 ms; when one RU includes 3 subcarriers and 8 time slots, and the RU size is 4 ms; when one RU includes 6 subcarriers and 4 time slots, and the RU size is 2 ms; when one RU includes 12 subcarriers and 2 time slots, and the RU size is 1 ms.

For NPUSCH format 2, the RU always includes 1 subcarrier and 4 time slots. Therefore, when the subcarrier space is 3.75 kHz, the RU size is 8 ms; when the subcarrier space is 15 kHz, the RU size is 2 ms.

Thus if RU duration is up to 32 ms in some cases, the power adjustment indicator indicated by an uplink grant in DCI may be not valid for the whole RU duration.

The resource allocation information in uplink DCI format N0 for NPUSCH transmission indicates to a scheduled UE a set of contiguously allocated subcarriers ($n_{sc}$) of a resource unit determined by the Subcarrier indication field in the corresponding DCI, a number of resource units ($N_{RU}$) determined by the resource assignment field in the corresponding DCI according to Table 3, a repetition number ($N_{Rep}$) determined by the repetition number field in the corresponding DCI according to Table 4.

TABLE 3

| Number of resource units ($N_{RU}$) for NPUSCH | |
|---|---|
| $I_{RU}$ | $N_{RU}$ |
| 0 | 1 |
| 1 | 2 |
| 2 | 3 |
| 3 | 4 |
| 4 | 5 |
| 5 | 6 |
| 6 | 8 |
| 7 | 10 |

TABLE 4

Number of repetitions ($N_{Rep}$) for NPUSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

For NPUSCH transmission for one TB, the transmission duration is determined by the subcarrier spacing, RU size, the number of resource units, and the repetition number. According to tables 2, 3, and 4, the maximal transmission duration for one TB is 32 ms×10×128=40960 ms=40 s, thus the power adjustment indicator indicated by an uplink grant in DCI for the transmission duration may be not valid.

Uplink Transmission Gap

Figure 3:
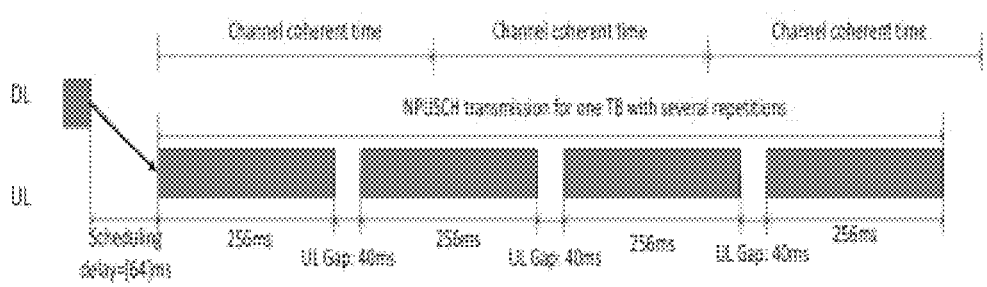
FIG. 3 is a schematic view of an example of channel variance for PUSCH transmission duration according to some embodiments of the present application.

In order to correct the frequency offset, the uplink transmission gap is introduced in NPUSCH transmission in NB-IoT system, so that the UE can pause the uplink transmission during long-term continuous transmission, use this time to switch to the downlink, and use a signal (such as NRS) in the NB-IoT downlink for synchronization tracking and frequency offset compensation. After a certain time compensation and reaching the specification requirements (i.e. frequency offset <50 Hz), the UE will switch to the uplink to continue uplink transmission. As shown in FIG. 3, after the NPUSCH transmission of the UE completes the data transmission of 256 ms as an example, an uplink transmission gap of 40 ms (UL Gap in FIG. 3) is configured to correct the frequency offset, and the remaining data is then transmitted.

Coherent Time and Doppler Spread

The channel coherent time Tc is determined by the Doppler spread fm, Tc=0.423/fm, if the channel distance is larger than Tc, it is assumed the channel fading beyond the coherent time is totally different. Table 5 illustrates the correspondence between fm and Tc.

TABLE 5

| fm [Hz] | Tc [ms] |
|---|---|
| 1 | 423 |
| 5 | 84 |

As shown in FIG. 3, there are several repetitions for one TB, UL gap is 40 ms, and the channel coherent time is 423 ms. Thus in some cases, the transmission duration for one TB in NB-IoT can be larger than the coherent time (e.g., 400 ms), so the channel condition of transmission duration for one TB is not the same or totally different for the TB transmission duration. For example, as shown in FIG. 3, the transmission for one TB with several repetitions may span multiple channel coherent time, so at least the fast fading channel condition is totally different for the whole TB transmission duration.

HARQ process, NB-IoT uplink power control, LTE uplink power control, NR uplink power control will be described in the following paragraphs.

In NB-IoT system, 2 HARQ process for uplink transmission is supported if the UE is configured with higher layer parameter twoHARQ-ProcessesConfig.

Figure 4:
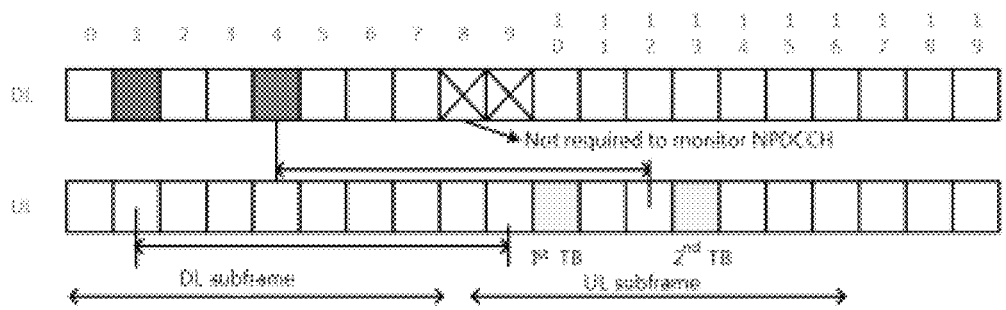
FIG. 4 is a schematic view of an example of NPDCCH schedule NPUSCH format 1 with 2 HARQ process according to some embodiments of the present application.

FIG. 4 illustrates an example of NPDCCH schedule NPUSCH format 1 with 2 HARQ process. In FIG. 4, downlink transmission is represented by "DL", uplink transmission is represented by "UL". As shown in FIG. 4, NPDCCH transmits an uplink grant in DL subframe 1 and another uplink grant in DL subframe 4, the uplink grant in DL subframe 1 schedules the uplink transmission (the first TB) transmitted in UL subframe 10, and the uplink grant in DL subframe 4 schedules the uplink transmission (the second TB) transmitted in UL subframe 13. For NB-IoT H-FDD, the continuous downlink subframe and continuous uplink subframes are configured by the BS. For example, as shown in FIG. 4, uplink grant for 2 TB (corresponding to 2 HARQ process number) is transmitted in the continuous downlink subframes (DL subframe 1 and DL subframe 4) and the uplink transmission for 2 TB is done in continuous uplink subframes (UL subframe 10 and UL subframe 13). The blocks with X represent the NPDCCH subframes which are not required to monitor by the UE.

Open Loop Power Control

Open loop power control is adopted in NB-IoT PUSCH. The UE transmit power $P_{NPUSCH,c}(i)$ for NPUSCH transmissions in NB-IoT UL slot i for the serving cell c is given by:

When the number of repetitions of the allocated NPUSCH RUs is greater than 2: [coverage enhancement case]

$$P_{NPUSCH,c}(i) = P_{CMAX,c}(i) \text{ [dBm]}$$

Otherwise [power ramping]

$$P_{NPUSCH,c}(i) = \min \begin{cases} P_{CMAX,c}(i), \\ 10\log_{10}(M_{NPUSCH,c}(i)) + P_{O\_NPUSCH,c}(j) + \alpha_c(j) \cdot PL_c \end{cases} \text{[dBm]}$$

$P_{CMAX,c}(i)$ is the configured UE transmitted power in NB-IoT UL slot i for the serving cell c;

$M_{NPUSCH,c}(i)$ is related to the bandwidth of the selected RU and the subcarrier spacing, and is {¼} for 3.75 kHz subcarrier spacing and {1, 3, 6, 12} for 15 kHz subcarrier spacing;

$P_{O\_NPUSCH,c}(j)$ is a parameter composed of the sum of a cell specific nominal component $P_{O\_NOMINAL\_PUSCH}(j)$ provided from higher layers for j=0 and 1 and a UE specific component $P_{O\_UE\_PUSCH}(j)$ provided by higher layers for j=0 and 1;

$\alpha_c(j)$ corresponds to a compensation factor of path loss;

$PL_c$ is the downlink path loss estimate for the serving cell c.

For Rel. 13 NB-IoT, only open loop power control is adopted for NPUSCH. Open loop power control is based on the average fading loss of the channel, which cannot reflect the channel fast fading fluctuation.

Closed Loop Power Control for LTE

Closed loop based uplink power control is adopted in LTE PUSCH. If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) =$$

$$\min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

[dBm]

The power adjustment value $f_c(i)$ can be implemented by accumulated power adjustment indicator (for example, accumulated $\delta_{PUSCH,c}$) or by absolute power adjustment indicator (for example, absolute $\delta_{PUSCH,c}$), which may be configured by higher layer signaling.

if accumulation is enabled $$f_c(i) = f_c(i-1) + \delta_{PUSCH,c}(i - K_{PUSCH})$$

$P_{CMAX,c}(i)$ is the configured UE transmitted power in NB-IoT UL slot i for the serving cell c;

$M_{PUSCH,c}(i)$ is the bandwidth of the PUSCH resource assignment expressed in number of resource blocks valid for subframe i;

$P_{O_{PUSCH,c}}(j)$ is a parameter composed of the sum of a cell specific nominal component $P_{O\_NOMINAL\_PUSCH}(j)$ provided from higher layers for j=0 and 1 and a UE specific component $P_{O\_UE\_PUSCH}(j)$ provided by higher layers for j=0 and 1;

$\alpha_c(j)$ corresponds to a compensation factor of path loss;

$PL_c$ is the downlink path loss estimate for the serving cell c;

$\Delta_{TF,c}(i)$ is related to the modulation manner, $\delta_{PUSCH,c}$ is a correction value, also referred to as a TPC command and is included in DCI format. $\delta_{PUSCH,c}$ may be also referred to as a power adjust indicator in the present application. Table 6 shows the value of $\delta_{PUSCH,c}$.

TABLE 6

TPC Command Field in DCI for accumulation

| TPC Command Field in DCI format | Accumulated $\delta_{PUSCH,c}$ [dB] |
|---|---|
| 0 | −1 |
| 1 | 0 |
| 2 | 1 |
| 3 | 3 | if accumulation is disable $$f_c(i) = \delta_{PUSCH,c}(i - K_{PUSCH})$$

$\delta_{PUSCH,c}$ is a correction value, also referred to as a TPC command and is included in DCI format. Table 7 shows the value of $\delta_{PUSCH,c}$.

TABLE 7

TPC Command Field in DCI for accumulation

| TPC Command Field in DCI format | Accumulated $\delta_{PUSCH,c}$ [dB] |
|---|---|
| 0 | −4 |
| 1 | −1 |
| 2 | 1 |
| 3 | 4 |

The value of $K_{PUSCH}$ is

For FDD, $K_{PUSCH} = 4$

For TDD configuration 0-6, $K_{PUSCH}$ is determined by Table 8.

TABLE 8

$K_{PUSCH}$ for TDD configuration 0-6

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Note: $f_c(i) = f_c(i-1)$ for a subframe where no PDCCH with DCI format 0/0A/0B/4/4A/4B is decoded for serving cell c or where DRX occurs or i is not an uplink subframe in TDD or FDD-TDD and serving cell c frame structure type 2.

Figure 5:
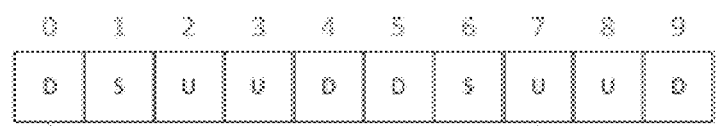
FIG. 5 is a schematic view of TDD configuration 1 according to some embodiments of the present application.

FIG. 5 is a schematic view of TDD configuration 1. Referring to FIG. 5, for LTE uplink closed loop power control, the power adjustment value $f_c(i)$ is determined by the previous power adjustment value $f_c(i-1)$ and power adjustment indicator $\delta_{PUSCH,c}(i - K_{PUSCH})$ indicated by uplink grant corresponding to the uplink subframe. For example, in FIG. 5, if TDD UL/DL Configuration index is 0, referring to Table 8, for subframe 7, the power adjustment value $f_c(7) = f_c(6) + \delta_{PUSCH,c}(7 - K_{PUSCH})$, the scheduling delay $K_{PUSCH} = 6$; for subframe 8, the power adjustment value $f_c(8) = f_c(7) + \delta_{PUSCH,c}(8 - K_{PUSCH})$, $K_{PUSCH} = 7$.

Closed Loop Power Control for NR

Closed loop based uplink power control is adopted in NR PUSCH. If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as $$P_{PUSCH,b,f,c}(i, j, q_d, l) =$$

$$\min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \\ \Delta_{TF,b,f,c}(i) + f_{b,f,c}(i, l) \end{cases}$$

[dBm]

The power adjustment value $f_{b,f,c}(i,l)$ can be implemented by accumulated power adjustment indicator (for example, accumulated $\delta_{PUSCH,b,f,c}$) or by absolute power adjustment indicator (for example, absolute $\delta_{PUSCH,b,f,c}$). The parameters in the above formula are almost the same as those for closed loop power control of LTE. Here only the power adjustment indicator $\delta_{PUSCH,b,f,c}$ indicated by DCI (uplink grant) is further described in detail as follows:

if accumulation is enabled $$f_{b,f,c}(i, l) = f_{b,f,c}(i - i_0, l) + \sum_{m=0}^{C(D_i)-1} \delta_{PUSCH,b,f,c}(m, l)$$

is the PUSCH power control adjustment state l for active UL BWP b of carrier f of serving cell c and PUSCH transmission occasion i if the UE is not provided tpc-Accumulation, where The $\delta_{PUSCH,b,f,c}$ values are given in Table 9.

$$\sum_{m=0}^{C(D_i)-1} \delta_{PUSCH,b,f,c}(m, l)$$

is a sum of TPC command values in a set $D_i$ of TPC command values with cardinality $C(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i $K_{PUSCH}(i)$ is a number of symbols for active UL BWP b of carrier f of serving cell c after a last symbol of a corresponding PDCCH reception and before a first symbol of the PUSCH transmission if accumulation is disable $f_{b,f,c}(i,l) = \delta_{PUSCH,b,f,c}(i,l)$ The $\delta_{PUSCH,b,f,c}$ values are given in Table 9.

TABLE 9

| TPC Command Field | Accumulated $\delta_{PUSCH,b,f,c}$ [dB] | Absolute $\delta_{PUSCH,b,f,c}$ [dB] |
|---|---|---|
| 0 | −1 | −4 |
| 1 | 0 | −1 |
| 2 | 1 | 1 |
| 3 | 3 | 4 |

Figure 6:
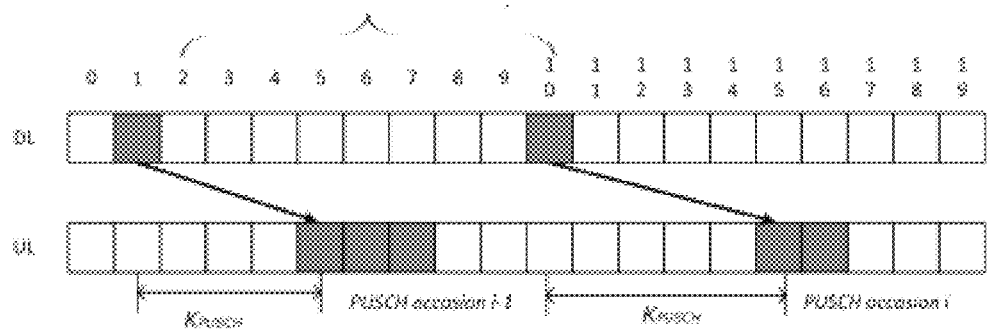
FIG. 6 is a schematic view of an example of PDCCH schedule PUSCH according to some embodiments of the present application.

FIG. 6 is a schematic view of an example of NPDCCH schedule NPUSCH in NR. In FIG. 6, downlink transmission is represented by "DL", uplink transmission is represented by "UL". Referring to FIG. 6, for NR uplink closed loop power control, the power adjustment value $f_c(i)$ of uplink transmission occasion i is determined by the previous power adjustment value $f_c(i-i_0)$ corresponding to uplink transmission occasion i−1 and power adjustment indicator $\delta_{PUSCH,c}$ indicated by uplink grant corresponding to uplink transmission occasion i.

More specifically, as shown in FIG. 6, for PUSCH occasion i−1, uplink transmissions transmitted in symbol 5 (sym #5), symbol 6 (sym #6), and symbol 7 (sym #7) are scheduled by the uplink grant in symbol 1 (sym #1), and the scheduling delay $K_{PUSCH}=4$; and for PUSCH occasion i, uplink transmissions transmitted in symbol 15 (sym #15) and symbol 16 (sym #16) are scheduled by the uplink grant in symbol 10 (sym #10) and the scheduling delay $K_{PUSCH}=5$. The TPC command set that UE receives between $K_{PUSCH}(i-1)-1=3$ symbols before PUSCH occasion i−1 and $K_{PUSCH}(i)=5$ before PUSCH occasion i (symbol 2 to symbol 10) is TPC command from symbol 10. Thus, within the time period from DL symbol 2 (sym #2) to symbol #10 (sym #10), a TPC command is received in symbol #10 (sym #10), and for PUSCH occasion i, $f_c(i) = f_c(i-1) + \delta_{PUSCH,c}(sym \#10)$.

For full duplex FDD and small scheduling delay, power adjustment parameter is always determined by the previous power adjustment value of previous uplink transmission occasion and power adjustment indicator $\delta_{PUSCH,c}(i-K_{PUSCH})$ indicated by uplink grant corresponding to the current uplink transmission.

However, for half-duplex FDD with large scheduling delay, more than 1 uplink grant is received by UE before PUSCH transmission (before switch to uplink transmission), if it follows the LTE closed loop power control, PUSCH power can be adjusted by its corresponding uplink grant, which is not precise if the latest power adjustment parameter indicated by uplink grant can also be used.

Figure 7:
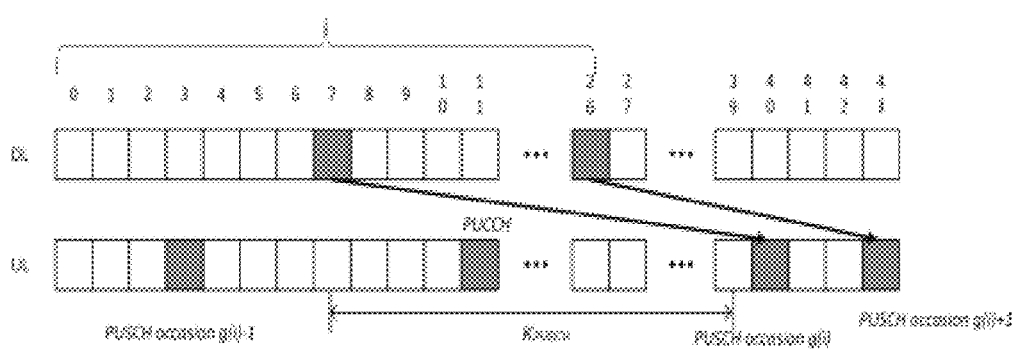
FIG. 7 illustrates a schematic view of another example of PDCCH schedule PUSCH according to some embodiments of the present application.

FIG. 7 illustrates a schematic view of another example of PDCCH schedule PUSCH.

In FIG. 7, downlink transmission is represented by "DL", uplink transmission is represented by "UL". Referring to FIG. 7, for NR uplink closed loop power control, the power adjustment value $f_c(i)$ of uplink transmission occasion g(i) is determined by the previous power adjustment value $f_c(i-i_0)$ corresponding to uplink transmission occasion g(i)−1 and power adjustment indicator $\delta_{PUSCH,c}$ indicated by uplink grant corresponding to uplink transmission occasion g(i).

More specifically, as shown in FIG. 7, slot i is corresponding to PUSCH transmission g(i). For PUSCH occasion g(i)−1, uplink transmission is transmitted in subframe 3 (sf #3): for PUSCH occasion g(i), uplink transmission in subframe 40 (sf #40) is scheduled by the uplink grant in subframe 7 (sf #7), and the scheduling delay $K_{PUSCH}=32$; for PUSCH occasion g(i)+1, uplink transmission in subframe 43 (sf #43) is scheduled by the uplink grant in subframe 26 (sf #26), and the scheduling delay $K_{PUSCH}=16$. Thus, within the time period from DL subframe #0 (sf #0) to subframe #26 (sf #26), TPC command is received in subframe #7 (sf #7) and subframe #26 (sf #26), and in legacy power control scheme, for PUSCH occasion g(i), the power adjustment value is only determined by TPC command received in subframe #7 in this case, e.g., $f_c(i) = f_c(i-1) + \delta_{PUSCH,c}(sf \#7)$, $K_{PUSCH}=32$.

That is, only power adjustment indicator $\delta_{PUSCH,c}$ (sf #7) of uplink grant corresponding to PUSCH occasion g(i) is adopted, the adjusted PUSCH power is not more precise. If power adjustment indicator $\delta_{PUSCH,c}(sf \#26)$ of uplink grant corresponding to PUSCH occasion g(i)+1 is also adopted to the PUSCH occasion g(i), more gains with multiple HARQ processes may be achieved.

The above case is common case, because NB-IoT supports H-FDD and long scheduling delay. During the period of uplink grant and PUSCH transmission occasion, there are several new uplink grant scheduling new PUSCH transmission occasion, so these new uplink grants may be fully used if necessary.

Figure 8:
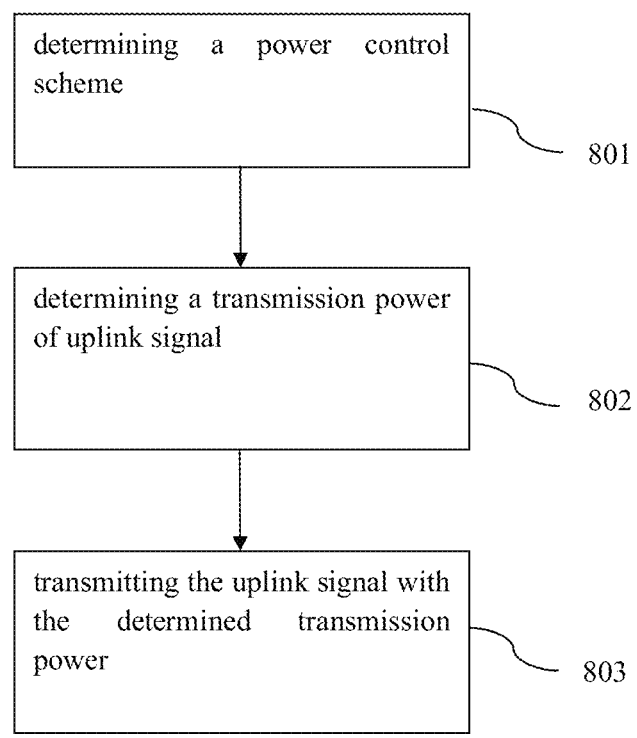
FIG. 8 illustrates a flow chart of a method for uplink power control according to some embodiments of the present application.

FIG. 8 illustrates a flow chart of a method for uplink power control according to some embodiments of the present application. The method may be performed by a UE, for example UE 101 in FIG. 1.

As shown in FIG. 8, in step 801, the UE determines a power control scheme. The power control scheme may be configured by RRC signaling. There may be several power control schemes for the UE. For example, the power control schemes may include at least one of an open loop power control scheme, a closed loop power control scheme (which is hereinafter referred to as first closed loop power control scheme), a closed loop power scheme with power ramping step selection (which is hereinafter referred to as second closed loop power control scheme), a closed loop power scheme with scaling factor to power adjustment indicator (which is hereinafter referred to as third closed loop power control scheme), a closed loop power scheme with later uplink signal corresponding power adjustment indicator adoption (which is hereinafter referred to as fourth closed loop power control scheme).

The open loop power control scheme may be a legacy NB-IoT power control scheme. The open loop power control is based on averaging RSRP and channel slow fading, which has more beneficial for long transmission duration.

The first closed loop power control scheme may be a legacy LTE power control scheme. The first closed loop power control reflects channel fasting fading, so the adoption period of the closed loop power should not be too long. The transmission power of an uplink signal is determined by a power adjustment indicator indicated by a control signal (that is, an uplink grant in DCI) from a BS.

The second closed loop power control scheme may be adopted, considering the uncertain of channel condition for a long period. The second closed loop power control scheme may be a power control scheme which is similar to the legacy LTE closed loop power control scheme. The difference is that the power adjustment indicator may be determined based on at least one of scheduling delay, RU size of the uplink signal, repetition number of the uplink signal, transmission gap, RRC signaling, and a threshold.

For example, in the legacy LTE closed loop power control scheme, if accumulation is enabled, the power adjustment indicator, i.e., the value of $\delta_{PUSCH,c}$ shown in Table 6 is selected. According to one embodiment of the present application, in the second closed loop power control scheme, if accumulation is enabled, the value of $\delta_{PUSCH,c}$ shown in Table 10 is selected. If accumulation is disabled, the value of $\delta_{PUSCH,c}$ shown in Table 11 is selected.

TABLE 10

TPC Command Field in DCI for accumulation

| TPC Command Field in DCI format | Accumulated $\delta_{PUSCH,c}$ [dB] |
| --- | --- |
| 0 | −0.25 |
| 1 | 0 |
| 2 | 0.25 |
| 3 | 0.75 |

TABLE 11

TPC Command Field in DCI for accumulation

| TPC Command Field in DCI format | Absolute $\delta_{PUSCH,c}$ [dB] |
| --- | --- |
| 0 | −1 |
| 1 | −0.25 |
| 2 | 0.25 |
| 3 | 1 |

According to another embodiment, the second closed loop power control scheme may be a power control scheme which is similar to the legacy NR closed loop power control scheme. In the second closed loop power control scheme, the power adjustment indicator may be also determined based on at least one of scheduling delay, RU size of the uplink signal, repetition number of the uplink signal, transmission gap, RRC signaling, and a threshold. For example, the value of $\delta_{PUSCH,b,f,c}$ shown in Table 12 may be selected.

TABLE 12

TPC Command Field

| TPC Command Field | Accumulated $\delta_{PUSCH,b,f,c}$ [dB] | Absolute $\delta_{PUSCH,b,f,c}$ [dB] |
| --- | --- | --- |
| 0 | −0.25 | −1 |
| 1 | 0 | −0.25 |
| 2 | 0.25 | 0.25 |
| 3 | 0.75 | 1 |

The third closed loop power scheme is a power control scheme which is similar to the legacy LTE closed loop power control scheme or the legacy NR closed loop power control scheme. The difference is that the transmission power of the uplink signal is determined by a power adjustment indicator indicated by an uplink grant and by a scaling factor. The scaling factor may be determined based on at least one of scheduling delay, RU size of the uplink signal, repetition number of the uplink signal, transmission gap, RRC signaling, and a threshold.

For example, in the third closed loop power scheme which is similar to the legacy LET closed loop power control scheme, if accumulation is enabled, $$f_c(i)=f_c(i-1)+\alpha\delta_{PUSCH,c}(i-K_{PUSCH})$$

$\delta_{PUSCH,c}$ is a correction value, also referred to as a TPC command (which may be also referred to as a power adjustment indicator in the present application) and is included in DCI format, the value of $\delta_{PUSCH,c}$ shown in Table 6 may be selected. The scaling factor, $\alpha$, may be configured by higher layer signalling, and may be {0.25, 0.5, 0.75, 1}.

According to another embodiment, for example, in the third closed loop power scheme which is similar to the legacy NR closed loop power control scheme, if accumulation is disable $$f_{b,f,c}(i,l)=\alpha\delta_{PUSCHb,f,c}(i,l)$$

The value of $\delta_{PUSCH,b,f,c}$ shown in Table 9 may be selected. The scaling factor, $\alpha$, may be {0.25, 0.5, 0.75, 1}.

The fourth closed loop power scheme is a power control scheme that the transmission power of the uplink signal is determined by a number of power adjustment indicators indicated by uplink grants corresponding to current uplink signal and later uplink signals later than the current uplink signal. The number of the power adjustment indicators can be determined by a maximal HARQ process number. The uplink grants are between a second number of time units before a previous uplink signal and a third number of time units before the current uplink signal, and the second number and the third number may be a fixed number, a minimum scheduling delay, or may be configured by RRC signaling.

In other words, according to the fourth closed loop power scheme, the power adjustment indicators indicated by the latest uplink grant before the NPUSCH transmission can be adapted to power control.

For example, for slot i, corresponding to PUSCH occasion g(i), the power adjustment value may be determined by the power adjustment indicators from uplink grants corresponding to the PUSCH occasion(s) g(i)+m (<=m<Maximal HARQ number) between the PUSCH occasion g(i)−1 and PUSCH occasion g(i).

For example, as shown in FIG. 7, for slot i, for PUSCH occasion g(i)−1, uplink transmission is transmitted in subframe 3 (sf #3): for PUSCH occasion g(i), uplink transmission in subframe 40 (sf #40) is scheduled by the uplink grant in subframe 7 (sf #7), and the scheduling delay $K_{PUSCH}$=32: for PUSCH occasion g(i)+1, uplink transmission in subframe 43 (sf #43) is scheduled by the uplink grant in subframe 26 (sf #26), and the scheduling delay $K_{PUSCH}$=16. Thus, for slot i, within the time period from DL subframe #0 (sf #0) to subframe #26 (sf #26) (subframe 0 is the subframe in N−1 slot before PUSCH transmission occasion g(i)−1, and subframe 26 is the subframe in N slot before PUSCH transmission occasion g(i)), TPC commands are received in subframe #7 (sf #7) and subframe #26 (sf #26). According to the fourth closed loop power scheme, for PUSCH occasion g(i), both the PUSCH occasion g(i) corresponding uplink grant (sf #7) corresponding to the uplink transmission in subframe 40 (sf #40) and PUSCH occasion g(i)+1 corresponding uplink grant (sf #26) corresponding to the uplink transmission in subframe 43 (sf #43) are utilized for power control. That is, for PUSCH occasion g(i), $f_c(i)=f_c(i-1)+\delta_{PUSCH,c}$(sf #7)$+\delta_{PUSCH,c}$(sf #26).

That is, the transmission power of the uplink transmission in subframe 40 (sf #40) for the PUSCH occasion g(i) is determined by power adjustment indicators indicated by the uplink grant in subframe 7 (sf #7) corresponding to the uplink transmission in subframe 40 (sf #40) and the uplink grant in subframe 26 (sf #26) corresponding to the later uplink transmission in subframe 43 (sf #43), which is later than the uplink transmission in subframe 40 (sf #40).

For PUSCH occasion g(i)+1, there is no uplink grant between the PUSCH occasion g(i) and PUSCH occasion g(i)+1, thus it follows the power adjustment value for PUSCH occasion g(i).

Figure 9:
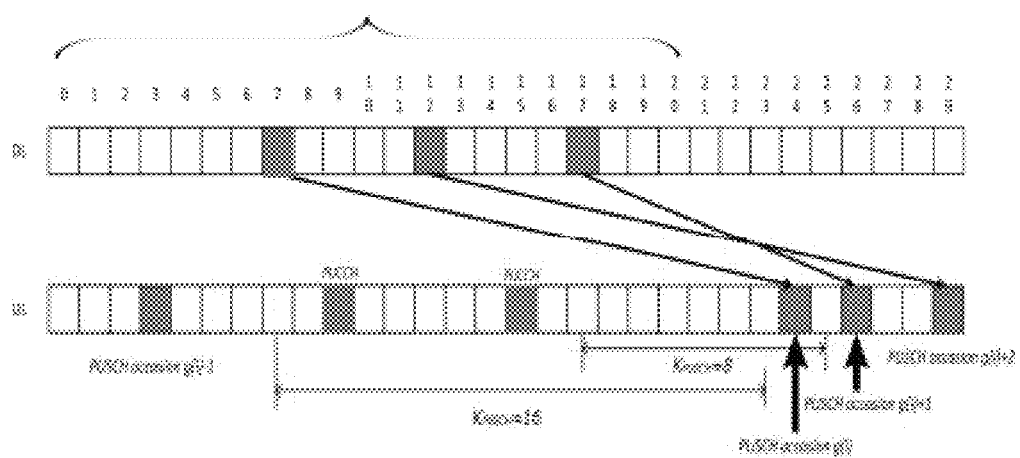
FIG. 9 illustrates a schematic view of another example of PDCCH schedule PUSCH according to some embodiments of the present application.

FIG. 9 illustrates another example of PDCCH schedule PUSCH.

As shown in FIG. 9, for slot i corresponding to PUSCH occasion g(i), for PUSCH occasion g(i)−1, uplink transmission is transmitted in subframe 3 (sf #3); for PUSCH occasion g(i), uplink transmission in subframe 24 (sf #24) is scheduled by the uplink grant in subframe 7 (sf #7), and the scheduling delay $K_{PUSCH}$=16; for PUSCH occasion g(i)+1, uplink transmission in subframe 26 (sf #26) is scheduled by the uplink grant in subframe 17 (sf #17), and the scheduling delay $K_{PUSCH}$=8; for PUSCH occasion g(i)+2, uplink transmission in subframe 29 (sf #29) is scheduled by the uplink grant in subframe 12 (sf #12), and the scheduling delay $K_{PUSCH}$=16. Thus, for slot i, within the time period from DL subframe #0 (sf #0) to subframe #20 (sf #20) (subframe 0 is the subframe in N−1 slot before PUSCH transmission occasion g(i)−1, and subframe 20 is the subframe in N slot before PUSCH transmission occasion g(i)), TPC commands are received in subframe #7 (sf #7), subframe #12 (sf #12), and subframe #17 (sf #17). According to the fourth closed loop power scheme, for PUSCH occasion g(i), the power adjustment value is determined by the power adjustment indicators from the uplink grant (sf #7) corresponding to the PUSCH occasion g(i), uplink grant (sf #12) corresponding to PUSCH occasion g(i)+1 and uplink grant (sf #17) corresponding to the PUSCH occasion g(i)+2. That is, for PUSCH occasion g(i), $f_c(i)=f_c(i-1)+\delta_{PUSCH,c}$(sf #7)$+\delta_{PUSCH,c}$(sf #12)$+\delta_{PUSCH,c}$(sf #17).

That is, the transmission power of the uplink transmission in subframe 24 (sf #24) for the PUSCH occasion g(i) is determined by power adjustment indicators indicated by the uplink grant in subframe #7 (sf #7) corresponding to the uplink transmission in subframe 24 (sf #24), the uplink grant in subframe 12 (sf #12) corresponding to the later uplink transmission in subframe 29 (sf #29), and the uplink grant in subframe 17 (sf #17) corresponding to the later uplink transmission in subframe 26 (sf #26), which are later than the uplink transmission in subframe #24 (sf #24).

Thus, compared with the NR closed loop power control, the power adjustment value of the current PUSCH occasion is determined by the power adjustment indicators from the later PUSCH occasions, the number of the later PUSCH occasions is determined by the maximal HARQ process number, and a new range of PUSCH occasions may be specified.

For example, the UE transmit power $P_{NPUSCH,c}(i)$ for NPUSCH transmissions in NB-IoT UL slot i for the serving cell (may be given by:

$$P_{NPUSCH,c}(i) = \min\begin{cases} P_{CMAX,c}(i), \\ 10\log_{10}(M_{NPUSCH,c}(i)) + P_{O\_PUSCH,c}(j) + \alpha_c(j) \cdot PL_c + f_c(i) \end{cases} [dBm]$$

$$f_c(i) = f_c(i-1) + \sum_{m=g(i)}^{c(D_{g(i)})} \delta_{PUSCH,c}(i - K_{PUSCH}(m))$$

UL slot i is corresponding to the first UL slot of PUSCH transmission occasion g(i).

$K_{PUSCH}$(m) is a number of subframes serving cell c after a last slot of corresponding PDCCH reception and before a first UL slot of the PUSCH transmission occasion m.

ΔK(s,t) is the number of slot of a first UL slot of PUSCH transmission occasion s and a last UL slot of PUSCH transmission occasion t $$\sum_{m=g(i)}^{c(D_{g(i)})} \delta_{PUSCH,c}(i - K_{PUSCH}(m) + \Delta K(m, g(i)))$$

is a sum of TPC command values in DCI corresponding to PUSCH transmission occasion set $D_g(i)$ with cardinality $C(D_{g(i)})$ that the UE receives between N−1 slot before PUSCH transmission occasion g(i)−1 and N slot before PUSCH transmission occasion g(i). For example, in FIG. 7, uplink grants received by the UE in subframe #7 (sf #7) and subframe #26 (sf #26) are between N−1 slot before PUSCH transmission occasion g(i)−1 for uplink transmission in subframe 3 (sf #3) and N slot before PUSCH transmission occasion g(i) for uplink transmission in subframe 40 (sf #40).

N is designed for transmission delay and UE detection time, so N=4, or consider the minimal scheduling delay of uplink grant and corresponding uplink transmission is 8 ms, N can be fixed to 8.

set $D_{g(i)}$ is a PUSCH transmission occasion set after the PUSCH transmission D occasion g(i) before PUSCH transmission occasion g(i)+M, and M is the maximal HARQ process number of uplink.

According to another embodiment, for example, the UE transmit power $P_{NPUSCH,c}(i)$ for NPUSCH transmissions in NB-IoT UL slot i for the serving cell c may be given by:

$$P_{PUSCH,c}(i) = \min \begin{cases} P_{CMAX,c}(i), \\ P_{O\_PUSCH,c}(j) + 10\log_{10}(2^\mu \cdot M_{RB,c}^{PUSCH}(i)) + \alpha_c(j) \cdot PL_c(q_d) + f_c(i) \end{cases} [dBm]$$

if accumulation is enabled $$f_c(i) = f_c(i-1) + \sum_{m=0}^{C(D_i)-1} \delta_{PUSCH,c}(m)$$

is the PUSCH power control adjustment for serving cell c and PUSCH transmission occasion i if the UE is not provided tpc-Accumulation, where $$\sum_{m=0}^{C(D_i)-1} \delta_{PUSCH,c}(m)$$

is a sum of TPC command values in a set $D_i$ of TPC command values with cardinality $C(D_i)$ that the UE receives between N−1 slot before PUSCH transmission occasion i−1 and N slot before PUSCH transmission occasion i. set $D_i$ is a PUSCH transmission occasion set after the PUSCH transmission occasion i before PUSCH transmission occasion i+M. and M is the maximal HARQ process number of uplink.

For the uplink transmission, if the time delay between the transmission and the uplink grant or the time delay between the DL scheduling and the corresponding PUCCH is larger than the coherent time, the power adjustment parameter may be not so precise anymore, so smaller and conservative power ramping step or open loop power scheme can be considered. The UE may select the power control scheme based on at least one of subcarrier spacing of the uplink signal, scheduling delay, RU size of the uplink signal, repetition number of the uplink signal, transmission gap, RRC signaling, and the threshold. The subcarrier spacing of the uplink signal and RU size of the uplink signal have been described with reference to Table 2, the scheduling delay has been described with reference to Table 1, and repetition number of the uplink signal has been described with reference to Table 4, which will not be described in detail here. The threshold may be configured by the RRC signaling or fixed.

For example, according to one embodiment, if scheduling delay is less than the threshold, the first closed loop power control scheme is selected; otherwise one of the open loop power control scheme, the second closed loop power scheme, the third closed loop power scheme, and the fourth closed loop power scheme may be selected.

For example, according to another embodiment, if repetition number of the uplink signal is less than the threshold, the first closed loop power control scheme is selected; otherwise one of the open loop power control scheme, the second closed loop power scheme, the third closed loop power scheme, and the fourth closed loop power scheme may be selected.

For example, according to another embodiment, if repetition number of the uplink signal is less than the threshold, the first closed loop power control scheme is selected for the transmission of the uplink signal with a transmission number smaller than the threshold, and one of the open loop power control scheme, the second closed loop power scheme, the third closed loop power scheme, and the fourth closed loop power scheme may be selected for the transmission of the uplink signal with the transmission number larger than the threshold.

For example, according to another embodiment, if RU size of the uplink signal*repetition number of the uplink signal+scheduling delay is less than the threshold, the first closed loop power control scheme is selected; otherwise one of the open loop power control scheme, the second closed loop power scheme, the third closed loop power scheme, and the fourth closed loop power scheme may be selected.

For example, according to another embodiment, if number of transmission gaps is less than the threshold, the first closed loop power control scheme is selected; otherwise one of the open loop power control scheme, the second closed loop power scheme, the third closed loop power scheme, and the fourth closed loop power scheme adoption may be selected.

For example, according to another embodiment, if number of transmission gaps is less than the threshold, the first closed loop power control scheme is selected for the transmission of the uplink signal before the number of the transmission gaps smaller than the threshold; and one of the open loop power control scheme, the second closed loop power scheme, the third closed loop power scheme, and the fourth closed loop power scheme may be selected for the transmission of the uplink signal after the number of the transmission gaps smaller than the threshold.

For example, according to another embodiment, if the subcarrier spacing is 3.75 KHz, one of the open loop power control scheme, the second closed loop power scheme, the third closed loop power scheme, and the fourth closed loop power scheme is selected, otherwise the first closed loop power control scheme may be selected.

Now referring to back FIG. 8, after a power control scheme is selected, in step 802, the UE determines a transmission power of the uplink signal according to the power control scheme. And in step 803, the UE transmits the uplink signal according to the determined transmission power.

Figure 10:
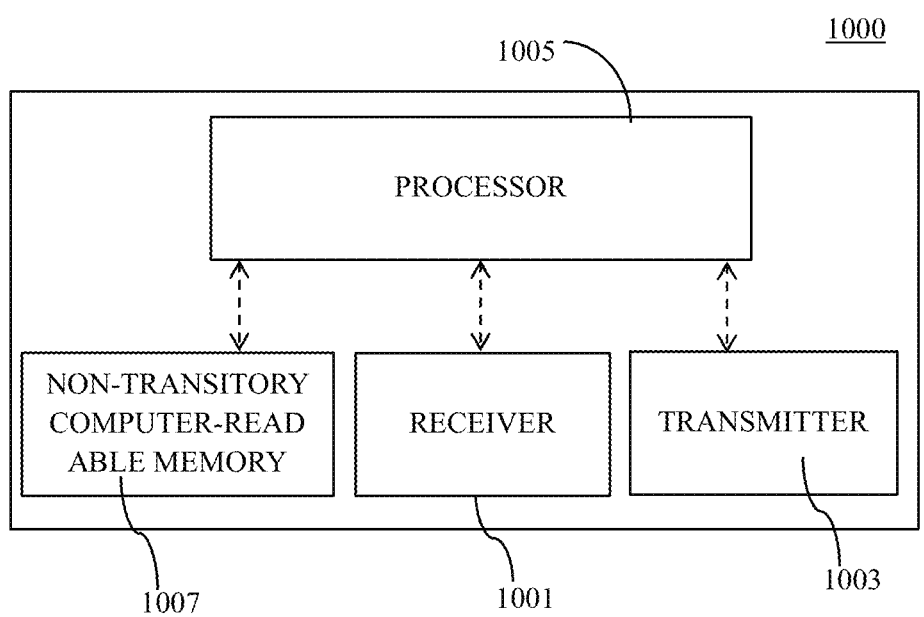
FIG. 10 illustrates an apparatus according to some embodiments of the present application.

FIG. 10 illustrates an apparatus according to some embodiments of the present application. In some embodiments of the present disclosure, the apparatus 1000 may be a UE 101 as illustrated in FIG. 1 or other embodiments of the present application.

As shown in FIG. 10, the apparatus 1000 may include a receiver 1001, a transmitter 1003, a processor 1005, and a non-transitory computer-readable medium 1007. The non-transitory computer-readable medium 1007 has computer executable instructions stored therein. The processer 1005 is configured to be coupled to the non-transitory computer readable medium 1007, the receiver 1001, and the transmitter 1003. It is contemplated that the apparatus 1000 may include more computer-readable mediums, receiver, transmitter and processors in some other embodiments of the present application according to practical requirements. In some embodiments of the present application, the receiver 1001 and the transmitter 1003 are integrated into a single device, such as a transceiver. In certain embodiments, the apparatus 1000 may further include an input device, a memory, and/or other components.

In some embodiments of the present application, the non-transitory computer-readable medium 1007 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:
    transmitting an uplink signal, wherein a transmission power of the uplink signal is determined according to a power control scheme selected from a set of power control schemes comprising a third closed loop power scheme with scaling factor to power adjustment indicator and a fourth closed loop power scheme with later uplink signal corresponding power adjustment indicator adoption.

2. The method of claim 1, wherein the power control scheme is selected based on at least one of subcarrier spacing of the uplink signal, scheduling delay, resource unit (RU) size of the uplink signal, repetition number of the uplink signal, transmission gap, radio resource control (RRC) signaling, or a threshold.

3. The method of claim 1, wherein the third closed loop power scheme with scaling factor to power adjustment indicator comprises a power control scheme that the transmission power of the uplink signal is determined by a power adjustment indicator indicated by a control signal and by a scaling factor.

4. The method of claim 3, wherein the scaling factor is configured by higher layer, and the scaling factor is determined based on at least one of scheduling delay, resource unit (RU) size of the uplink signal, repetition number of the uplink signal, a transmission gap, radio resource control (RRC) signaling, or a threshold.

5. The method of claim 4, wherein the threshold is configured by the RRC signaling or fixed.

6. The method of claim 1, wherein the fourth closed loop power scheme with later uplink signal corresponding power adjustment indicator adoption comprises a power control scheme that the transmission power of the uplink signal is determined by a first number of power adjustment indicators indicated by control signals corresponding to the uplink signal and later uplink signals later than the uplink signal.

7. The method of claim 6, wherein the first number is determined by a maximal hybrid automatic repeat request (HARQ) process number.

8. The method of claim 6, wherein the control signals are between a second number of time units before a previous one uplink signal of the uplink signal and a third number of time units before the uplink signal, and wherein the second number and the third number are a fixed number or a minimum scheduling delay or configured by radio resource control (RRC) signaling.

9. An apparatus, comprising:
    at least one memory; and
    at least one processor coupled with the at least one memory and configured to cause the apparatus to:
        select a power control scheme from a set of power control schemes comprising a third closed loop power scheme with scaling factor to power adjustment indicator and a fourth closed loop power scheme with later uplink signal corresponding power adjustment indicator adoption;
        determine a transmission power according to the selected power control scheme; and
        transmit an uplink signal based on the determined transmission power.

10. The apparatus of claim 9, wherein the power control scheme is further selected based on at least one of subcarrier spacing of the uplink signal, scheduling delay, resource unit (RU) size of the uplink signal, repetition number of the uplink signal, transmission gap, radio resource control (RRC) signaling, or a threshold.

11. A user equipment (UE) comprising:
    at least one memory; and
    at least one processor coupled with the at least one memory and configured to cause the UE to:
        select a power control scheme from a set of power control schemes comprising a third closed loop power scheme with scaling factor to power adjustment indicator and a fourth closed loop power scheme with later uplink signal corresponding power adjustment indicator adoption;
        determine a transmission power according to the selected power control scheme; and
        transmit an uplink signal based on the determined transmission power.

12. The UE of claim 11, wherein the power control scheme is further selected based on at least one of subcarrier spacing of the uplink signal, scheduling delay, resource unit (RU) size of the uplink signal, repetition number of the uplink signal, a transmission gap, radio resource control (RRC) signaling, or a threshold.

13. The UE of claim 11, wherein the third closed loop power scheme with scaling factor to power adjustment indicator comprises a power control scheme that the transmission power of the uplink signal is determined by a power adjustment indicator indicated by a control signal and by a scaling factor.

14. The UE of claim 13, wherein the scaling factor is configured by higher layer, and the scaling factor is determined based on at least one of scheduling delay, resource unit (RU) size of the uplink signal, repetition number of the uplink signal, a transmission gap, radio resource control (RRC) signaling, or a threshold.

15. The UE of claim 14, wherein the threshold is configured by the RRC signaling or fixed.

16. The UE of claim 11, wherein the fourth closed loop power scheme with later uplink signal corresponding power adjustment indicator adoption comprises a power control scheme that the transmission power of the uplink signal is determined by a first number of power adjustment indicators indicated by control signals corresponding to the uplink signal and later uplink signals later than the uplink signal.

17. A processor for wireless communication, comprising:
at least one controller coupled with at least one memory and configured to cause the processor to:
select a power control scheme from a set of power control schemes comprising a third closed loop power scheme with scaling factor to power adjustment indicator and a fourth closed loop power scheme with later uplink signal corresponding power adjustment indicator adoption;
determine a transmission power according to the selected power control scheme; and
transmit an uplink signal based on the determined transmission power.

18. The processor of claim 17, wherein the power control scheme is further selected based on at least one of subcarrier spacing of the uplink signal, scheduling delay, resource unit (RU) size of the uplink signal, repetition number of the uplink signal, transmission gap, radio resource control (RRC) signaling, or a threshold.

19. The processor of claim 17, wherein the third closed loop power scheme with scaling factor to power adjustment indicator comprises a power control scheme that the transmission power of the uplink signal is determined by a power adjustment indicator indicated by a control signal and by a scaling factor.

20. The processor of claim 19, wherein the scaling factor is configured by higher layer, and the scaling factor is determined based on at least one of scheduling delay, resource unit (RU) size of the uplink signal, repetition number of the uplink signal, a transmission gap, radio resource control (RRC) signaling, or a threshold.

* * * * *